United States Patent
Stern

(10) Patent No.: US 8,210,798 B2
(45) Date of Patent: Jul. 3, 2012

(54) COOLED PUSHER PROPELLER SYSTEM

(75) Inventor: Alfred M. Stern, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 1177 days.

(21) Appl. No.: 12/030,400

(22) Filed: Feb. 13, 2008

(65) Prior Publication Data

US 2009/0202357 A1    Aug. 13, 2009

(51) Int. Cl.
*F04D 31/00* (2006.01)
*F01D 5/08* (2006.01)
*F01D 5/18* (2006.01)

(52) U.S. Cl. ............... 415/116; 416/96 R; 416/97 R

(58) Field of Classification Search .............. 415/115, 415/116; 416/96 R, 96 A, 97 R, 231 R; 244/204, 244/207, 208, 209
See application file for complete search history.

(56) References Cited

U.S. PATENT DOCUMENTS

| | | | | |
|---|---|---|---|---|
| 2,627,927 A * | 2/1953 | Mergen | ............ | 416/94 |
| 3,811,791 A * | 5/1974 | Cotton | ............ | 416/129 |
| 3,963,368 A * | 6/1976 | Emmerson | .............. | 415/115 |
| 4,171,183 A | 10/1979 | Cornell et al. | | |
| 4,488,399 A * | 12/1984 | Robey et al. | ............ | 60/262 |
| 4,569,199 A | 2/1986 | Klees et al. | | |
| 4,688,995 A * | 8/1987 | Wright et al. | ............. | 416/127 |
| 4,789,304 A | 12/1988 | Gustafson et al. | | |
| 4,817,382 A * | 4/1989 | Rudolph et al. | ............. | 60/268 |
| 4,864,820 A * | 9/1989 | Wynosky et al. | ............. | 60/226.1 |
| 4,892,269 A * | 1/1990 | Greco et al. | ............ | 244/53 R |
| 4,930,725 A | 6/1990 | Thompson et al. | | |
| 5,186,609 A * | 2/1993 | Inoue et al. | ............ | 416/129 |
| 5,720,431 A * | 2/1998 | Sellers et al. | ............. | 416/97 R |
| 5,931,637 A | 8/1999 | Wheeler | | |
| 6,041,589 A | 3/2000 | Giffin, III et al. | | |
| 6,422,816 B1 | 7/2002 | Danielson | | |
| 6,511,292 B2 | 1/2003 | Perkinson et al. | | |
| 6,514,044 B2 | 2/2003 | Talasco et al. | | |
| 6,651,929 B2 | 11/2003 | Dionne | | |
| 6,753,513 B2 | 6/2004 | Goldberg et al. | | |
| 6,769,874 B2 | 8/2004 | Arel | | |
| 6,811,376 B2 | 11/2004 | Arel et al. | | |
| 6,851,929 B2 | 2/2005 | Goldberg | | |
| 6,942,181 B2 | 9/2005 | Dionne | | |
| 6,981,844 B2 | 1/2006 | Perkinson et al. | | |
| 7,159,817 B2 | 1/2007 | VanderMey et al. | | |
| 7,198,468 B2 * | 4/2007 | Papple | ............ | 416/97 R |
| 7,296,969 B2 | 11/2007 | Raes et al. | | |
| 7,438,528 B2 * | 10/2008 | Goodman et al. | ........... | 416/97 R |
| 2006/0137355 A1* | 6/2006 | Welch et al. | ............ | 60/772 |
| 2008/0014095 A1* | 1/2008 | Moniz et al. | ............. | 416/97 R |

* cited by examiner

*Primary Examiner* — Justine Yu
*Assistant Examiner* — Jason Davis
(74) *Attorney, Agent, or Firm* — Carlson, Gaskey & Olds, PC

(57) ABSTRACT

A propulsion system and method includes an annular exhaust nozzle about an axis radially outboard of the annular cooling flow nozzle and ejecting an exhaust flow through an annular exhaust nozzle about an axis radially outboard of the annular cooling flow nozzle.

27 Claims, 3 Drawing Sheets

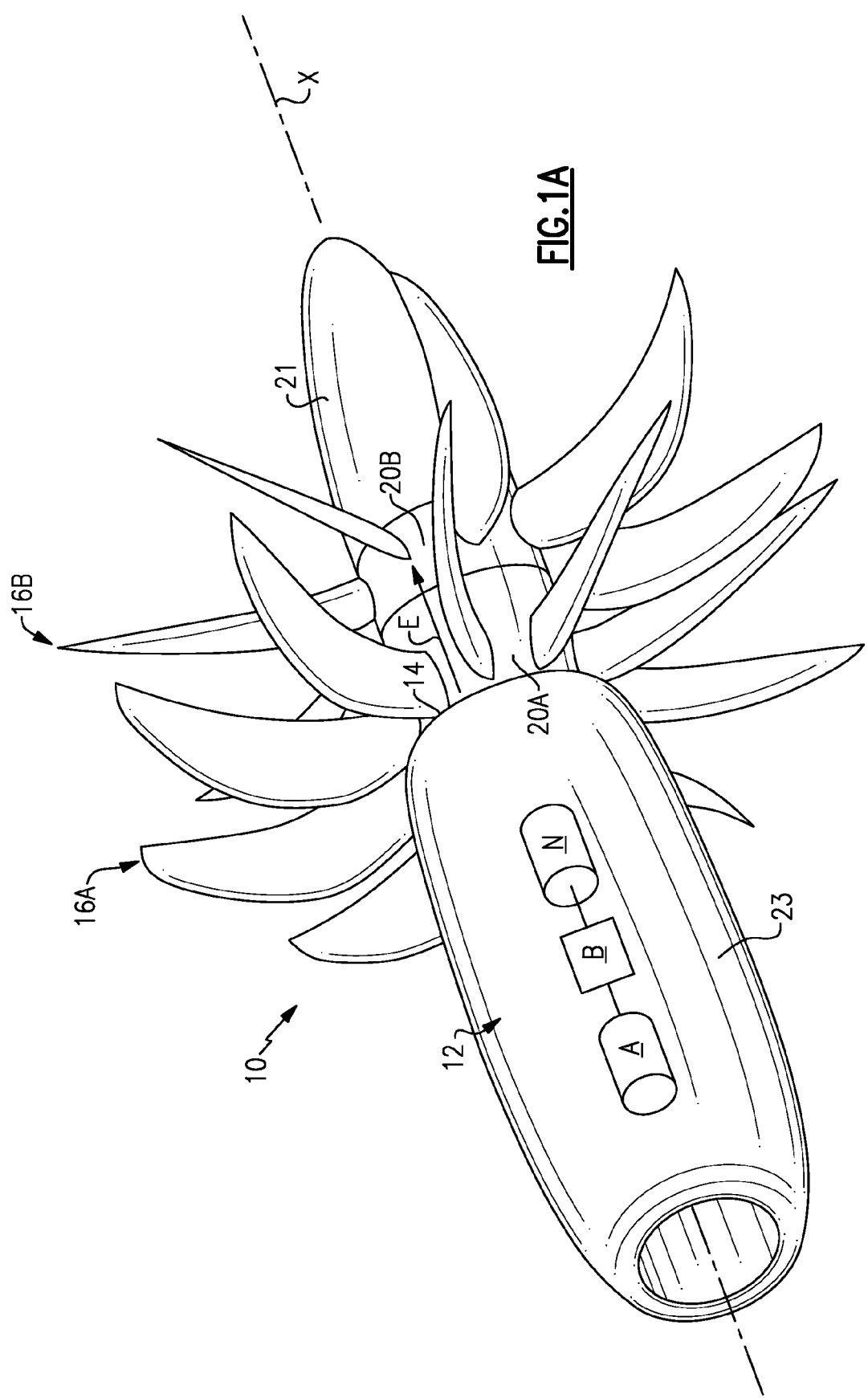

COOLED PUSHER PROPELLER SYSTEM

BACKGROUND

The present invention relates to a propeller system, and more particularly to a propeller system for a pusher type counter-rotating propulsion system.

Turboprop engines are commonly designed to drive either a single row of propellers or two rows of counter rotating propellers. The propeller(s) may be mounted forward of the engine ("tractor" installation) or rearwardly of the engine ("pusher" installation). In the pusher arrangement, the engine has an efficient free stream inlet, and the high speed propeller jet does not impinge on airplane or nacelle surfaces, thus avoiding scrubbing drag. Also, a pusher engine installation on the aircraft empennage minimizes cabin noise generated by wing-mounted tractor nacelle engines.

A pusher arrangement, however, may complicate the location for the gas turbine exhaust. One pusher arrangement locates the gas turbine exhaust upstream of the propellers in an annular or lobed configuration. This configuration may require the nacelle skin downstream of the exhaust and a root section of the propeller blades to be designed for elevated temperatures caused by the hot exhaust gases. Furthermore, hot engine exhaust directed past the pusher propeller may increase noise and reduce airfoil life.

SUMMARY

A propulsion system according to an exemplary aspect of the present invention includes: a first row of propeller blades which rotate about an axis; an annular cooling flow nozzle about an axis, the annular cooling flow nozzle upstream of the first row of propeller blades; and an annular exhaust nozzle about an axis radially outboard of the annular cooling flow nozzle, the annular exhaust nozzle upstream of the first row of propeller blades.

A method of directing an exhaust flow from a propulsion system according to an exemplary aspect of the present invention includes: ejecting a cooling flow through an annular cooling flow nozzle upstream of a first row of propeller blades which rotate about an axis; and ejecting an exhaust flow through an annular exhaust nozzle about an axis radially outboard of the annular cooling flow nozzle.

BRIEF DESCRIPTION OF THE DRAWINGS

The various features and advantages of this invention will become apparent to those skilled in the art from the following detailed description of the disclosed non-limiting embodiment. The drawings that accompany the detailed description can be briefly described as follows:

FIG. 1A is a general perspective view of one exemplary pusher type counter-rotating propulsion system embodiment for use with the present invention;

DETAILED DESCRIPTION OF THE EXEMPLARY EMBODIMENTS

Figure 1B:
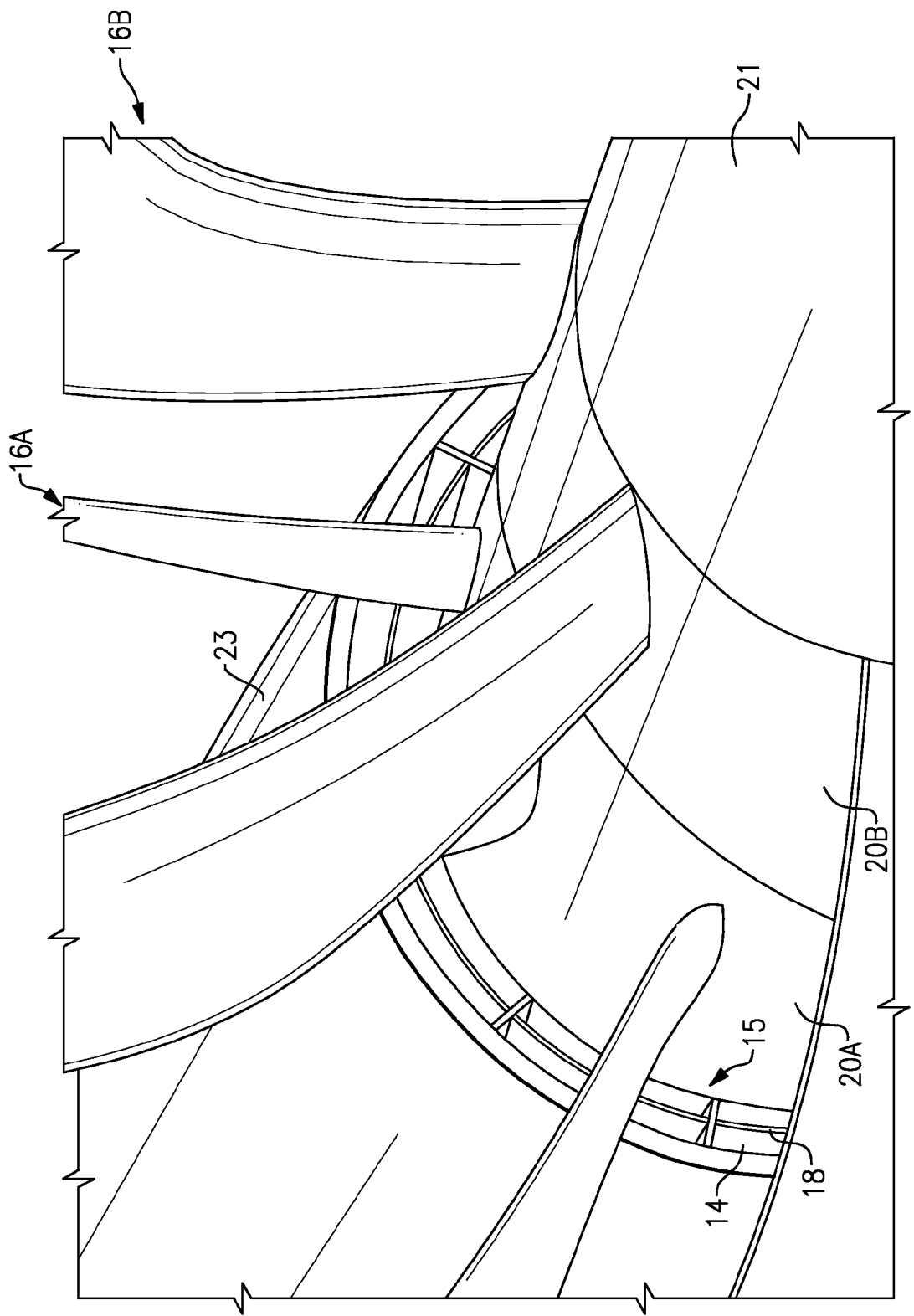
FIG. 1B is an expanded view of a nozzle section of the pusher type counter-rotating propulsion system of FIG. 1A.

FIG. 1A schematically illustrates a pusher type counter-rotating propulsion system 10. A gas turbine engine 12 generally includes a compressor section A, a combustor section B and a turbine section N as generally understood. Air is compressed by the compressor section A, mixed and burned with fuel within the combustor section B, then expanded over the turbine section T to generate a high temperature exhaust gas flow E. The exhaust gas flow E from the turbine section N of the gas turbine engine 12 is communicated through an annular exhaust nozzle 14 (FIG. 1B) upstream of a first row of propeller blades 16A which rotate about an axis X. A second row of row of propeller blades 16B may be located downstream of the first row of propeller blades 16A in a counter-rotating propeller (CRP) propfan pusher configuration about the axis X.

Referring to FIG. 1B, the annular exhaust nozzle 14 in one non-limiting embodiment is defined radially outboard of an annular cooling flow nozzle 18. A cooling flow C and/or other airflow that is different from the exhaust gas flow E is communicated through the annular cooling flow nozzle 18. The cooling flow C may be sourced from, for example only, a compressor section of the gas turbine engine 12, an inlet or other source.

The annular exhaust nozzle 14 and annular cooling flow nozzle 18 form an annular nozzle section 15 generally upstream of the first row of propeller blades 16A. The annular exhaust nozzle 14 and annular cooling flow nozzle 18 may be radially defined between a radially outboard engine nacelle 23 and a radially inboard first spinner section 20A which mounts the first row of propeller blades 16A (FIG. 1B). A second spinner section 20B which mounts the second row of propeller blades 16B is downstream of the first spinner section 20A. The second spinner section 20B counter rotates relative the first spinner section 20A while a tail cone 21 is located downstream of the second spinner section 20B. The tail cone 21 is aerodynamically shaped and in one embodiment remains rotationally stationary to facilitate flow.

The nozzles 14, 18 have a relatively low profile and are aerodynamically shaped to minimize noise, drag and weight. The exhaust gas flow and the cooling flow are substantially uniform and directed through the first and second row of propeller blades 16A, 16B to avoid significant noise addition. The nozzles 14, 18 direct the exhaust stream E and the cooling flow C aftward such that at least a portion of the propulsive energy within the streams are exploited.

Figure 2:
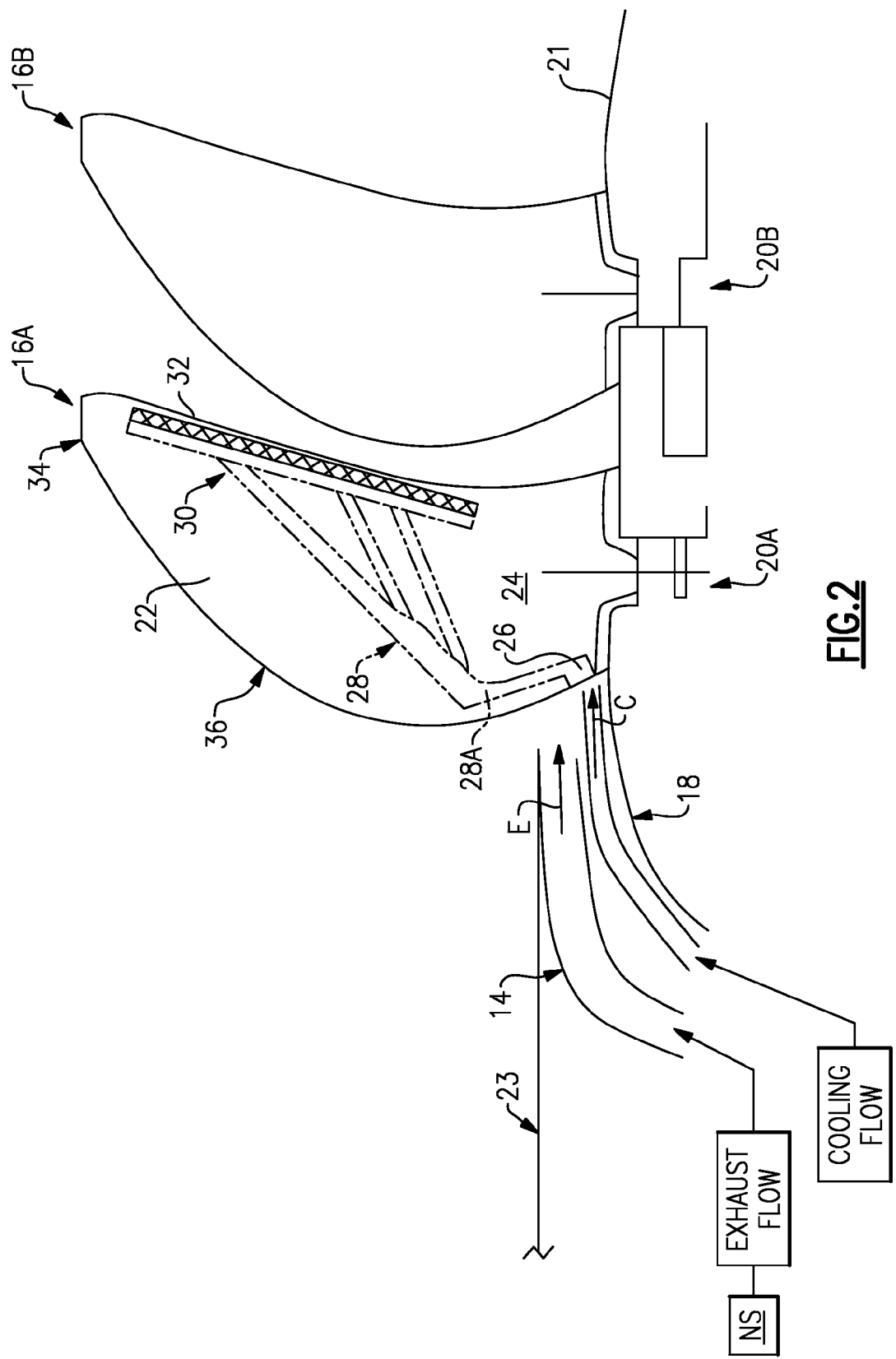
FIG. 2 is a sectional view of the nozzle section of the pusher type counter-rotating propulsion system.

Referring to FIG. 2, the cooling flow C is directed essentially under the annular exhaust gas flow E to enter each blade 22 at a root section 24 thereof. It should be understood that although only a single propeller blade 22 will be described, the description is similarly applicable to each of the propeller blades 22 in the first row of propeller blades 16A and/or the second row of propeller blades 16B. The cooling flow C operates to lower the temperature of the root section 24 which is proximate the exhaust gas flow E as well as film cool and insulate the spinner sections 20A, 20B and tail cone 21 at least partially from the exhaust gas flow E. The root section 24 may additionally be mechanically insulated or otherwise hardened to further resist the exhaust gas flow E.

The root section 24 includes an intake 26 which communicates with a distribution channel 28. The distribution channel 28 may be defined at least in part by hollow airfoil sections and/or passages in the blade 22. The cooling flow C is communicated through the distribution channel 28 to an exit 30. Once the cooling flow enters the blade 22, the cooling flow C is self-pumped, by the rotational force of blade 22, through the distribution channel 28 which results in thrust recovery when ejected from the exit 30. The exit 30 may be located adjacent a trailing edge section 32 and/or a blade tip section 34. The exit 30 may alternatively or additionally be distributed along the blade trailing edge section 32 to minimize an airfoil wake deficit with a corresponding potential noise reduction. The cooling flow may additionally be directed through a forward distribution channel section 28A adjacent a leading edge section 36 where hot gas impingement exists so as to reduce noise generation while the annular exhaust flow path is generally maintained.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A propulsion system comprising:
   a first row of propeller blades which rotate about an axis;
   an annular cooling flow nozzle about an axis, said annular cooling flow nozzle upstream of said first row of propeller blades;
   an annular exhaust nozzle about an axis radially outboard of said annular cooling flow nozzle, said annular exhaust nozzle upstream of said first row of propeller blades; and
   wherein each propeller blade in said first row of propeller blades includes an inlet within a root section, said inlet in communication with a cooling flow from said annular cooling flow nozzle.

2. The system as recited in claim 1, further comprising a second row of propeller blades which rotate about said axis in a direction opposite said first row of propeller blades, said second row of propeller blades downstream of said first row of propeller blades.

3. The system as recited in claim 2, further comprising a tail cone downstream of said second row of propeller blades.

4. The system as recited in claim 1, wherein each propeller blade radially extends beyond an engine nacelle.

5. The system as recited in claim 1, wherein said annular exhaust nozzle communicates an exhaust gas flow from a turbine section of a gas turbine engine.

6. A propulsion system comprising:
   a first row of propeller blades which rotate about an axis;
   an annular cooling flow nozzle about said axis, said annular cooling flow nozzle upstream of said first row of propeller blades;
   an annular exhaust nozzle about said axis radially outboard of said annular cooling flow nozzle, said annular exhaust nozzle upstream of said first row of propeller blades; and
   a distribution channel in communication with an inlet to said propeller blade.

7. The system as recited in claim 6, further comprising an exit in communication with said distribution channel.

8. The system as recited in claim 7, wherein said exit is located adjacent a blade trailing edge section.

9. The system as recited in claim 7, wherein said exit is located adjacent a blade tip section.

10. The system as recited in claim 7, wherein said exit is distributed along a blade trailing edge section.

11. A propulsion system comprising:
    a first row of propeller blades which rotate about an axis, each propeller blade in said first row of propeller blades having an inlet within a root section;
    an annular cooling flow nozzle about said axis, said annular cooling flow nozzle upstream of said first row of propeller blades, said inlet in communication with a cooling flow from said annular cooling flow nozzle; and
    an annular exhaust nozzle about said axis radially outboard of said annular cooling flow nozzle, said annular exhaust nozzle upstream of said first row of propeller blades.

12. The system as recited in claim 11, further comprising a second row of propeller blades which rotate about said axis in a direction opposite said first row of propeller blades, said second row of propeller blades downstream of said first row of propeller blades.

13. The system as recited in claim 12, further comprising a distribution channel in communication with said inlet.

14. The system as recited in claim 13, further comprising an exit in communication with said distribution channel.

15. The system as recited in claim 14, wherein said cooling flow is self-pumped through said distribution channel which results in thrust recovery when ejected from said exit.

16. The system as recited in claim 12, further comprising a tail cone downstream of said second row of propeller blades.

17. The system as recited in claim 11, wherein each propeller blade radially extends beyond an engine nacelle.

18. The system as recited in claim 11, wherein said annular exhaust nozzle communicates an exhaust gas flow from a turbine section of a gas turbine engine.

19. A method of directing an exhaust flow from a propulsion system comprising:
    ejecting a cooling flow through an annular cooling flow nozzle upstream of a first row of propeller blades which rotate about an axis;
    self-pumping the cooling flow through each propeller of the first row of propeller blades; and
    ejecting an exhaust flow from a turbine section of a gas turbine engine through an annular exhaust nozzle about the axis radially outboard of the annular cooling flow nozzle.

20. A method as recited in claim 19, further comprising:
    recovering thrust from the cooling flow through each propeller of the first row of propeller blades.

21. A method as recited in claim 19, further comprising:
    distributing the cooling flow from each propeller to minimize an airfoil wake deficit.

22. A method as recited in claim 21, further comprising:
    minimizing an acoustic signature in response to the minimization of the airfoil wake deficit.

23. A method as recited in claim 19, further comprising:
    rotating a second row of propeller blades in a direction opposite the first row of propeller blades, the second row of propeller blades downstream of the first row of propeller blades.

24. A method as recited in claim 19, further comprising ejecting the exhaust flow from the annular exhaust nozzle located through an engine nacelle.

25. A propulsion system comprising:

a first row of propeller blades which rotate about an axis;

an annular cooling flow nozzle about said axis, said annular cooling flow nozzle upstream of said first row of propeller blades; and an annular exhaust nozzle about said axis radially outboard of said annular cooling flow nozzle, said annular exhaust nozzle upstream of said first row of propeller blades, and wherein said annular cooling flow nozzle is radially outboard of a first spinner section.

26. A propulsion system comprising:

a first row of propeller blades which rotate about an axis;

an annular cooling flow nozzle about said axis, said annular cooling flow nozzle upstream of said first row of propeller blades; and an annular exhaust nozzle about said axis radially outboard of said annular cooling flow nozzle, said annular exhaust nozzle upstream of said first row of propeller blades, and wherein said annular exhaust nozzle is radially outboard of a first spinner section.

27. A propulsion system comprising:

a first row of propeller blades which rotate about an axis;

an annular cooling flow nozzle about said axis, said annular cooling flow nozzle upstream of said first row of propeller blades; and an annular exhaust nozzle about said axis radially outboard of said annular cooling flow nozzle, said annular exhaust nozzle upstream of said first row of propeller blades, and wherein said annular cooling flow nozzle and said annular exhaust nozzle are radially outboard of a first spinner section.

* * * * *